(12) United States Patent
Yang et al.

(10) Patent No.: US 9,952,336 B2
(45) Date of Patent: Apr. 24, 2018

(54) PHOTOSENSORS ARRANGED ON A SURFACE OF A SCINTILLATOR

(71) Applicant: SAINT-GOBAIN CERAMICS & PLASTICS, INC., Worcester, MA (US)

(72) Inventors: Kan Yang, Solon, OH (US); Peter R. Menge, Novelty, OH (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 0 days.

(21) Appl. No.: 15/488,274

(22) Filed: Apr. 14, 2017

(65) Prior Publication Data

US 2017/0329024 A1 Nov. 16, 2017

Related U.S. Application Data

(60) Provisional application No. 62/323,315, filed on Apr. 15, 2016, provisional application No. 62/398,074, filed on Sep. 22, 2016.

(51) Int. Cl.
*G01T 1/20* (2006.01)
(52) U.S. Cl.
CPC .......... *G01T 1/2018* (2013.01); *G01T 1/2002* (2013.01)
(58) Field of Classification Search
CPC .................. G01T 1/2002; G01T 1/2018
See application file for complete search history.

(56) References Cited

U.S. PATENT DOCUMENTS

| 8,481,948 B2 | 7/2013 | Frach et al. |
| 2004/0016885 A1 | 1/2004 | Ikhlef |
| 2007/0221856 A1* | 9/2007 | Eriksson ............... G01T 1/1642 250/368 |
| 2010/0116995 A1 | 5/2010 | Levene et al. |
| 2012/0235047 A1 | 9/2012 | Lewellen et al. |
| 2013/0009067 A1 | 1/2013 | Schmand et al. |

(Continued)

FOREIGN PATENT DOCUMENTS

WO 2015130770 A1 9/2015

OTHER PUBLICATIONS

Tabacchini et al., Time-based position estimation in monolithic scintillator detectors, Physics in Medicine and Biology, 2015, pp. 5513-5525, vol. 60, Institute of Physics and Engineering in Medicine, GB.

(Continued)

*Primary Examiner* — Mark R Gaworecki
(74) *Attorney, Agent, or Firm* — Abel Law Group, LLP; Robert N. Young

(57) ABSTRACT

A radiation detector can include a scintillator having opposing end surfaces and a plurality of discrete photosensors disposed on an end surface of the scintillator. In an embodiment, the photosensors are disposed at the corners or along the peripheral edge of the end surface, as opposed to being disposed at the center of the end surface. In an embodiment, the plurality of discrete photosensors may cover at most 80% of a surface area of the end surface of the scintillator and may not cover a center of the end surface of the scintillator. In a further embodiment, an aspect ratio of the monolithic scintillator can be selected to improve energy resolution.

19 Claims, 8 Drawing Sheets

(56) References Cited

U.S. PATENT DOCUMENTS

2014/0175296 A1 6/2014 Benlloch Baviera et al.
2016/0223684 A1* 8/2016 Uchida ................ G01T 1/2008

OTHER PUBLICATIONS

Ruud Vinke, PET Detector Components, Time-of-flight PET with SiPM sensors on monolithic scintillation crystals, 2011, pp. 17-47.
International Search Report and Written Opinion for PCT/US2017/027769, dated Oct. 24, 2017, 12 pages.

* cited by examiner

PHOTOSENSORS ARRANGED ON A SURFACE OF A SCINTILLATOR

CROSS-REFERENCE TO RELATED APPLICATION(S)

This application claims priority under 35 U.S.C. § 119(e) to U.S. Patent Application No. 62/323,315 entitled "PHOTOSENSORS ARRANGED ON AN END SURFACE OF A SCINTILLATOR," by Kan Yang and Peter R. Menge, filed Apr. 15, 2016, which is assigned to the current assignee hereof and incorporated herein by reference in its entirety. This application also claims priority under 35 U.S.C. § 119(e) to U.S. Patent Application No. 62/398,074 entitled "PHOTOSENSORS ARRANGED ON A SURFACE OF A SCINTILLATOR," by Kan Yang and Peter R. Menge, filed Sep. 22, 2016, which is assigned to the current assignee hereof and incorporated herein by reference in its entirety.

FIELD OF THE DISCLOSURE

The present disclosure is directed to the arrangement of photosensors on a scintillator and methods of using such scintillators and photosensors in a radiation detector.

BACKGROUND

Scintillator-based detectors are used in a variety of applications, including research in nuclear physics, oil exploration, field spectroscopy, container and baggage scanning, and medical diagnostics. When a scintillator material of the scintillator-based detector is exposed to ionizing radiation, the scintillator material captures energy of incoming radiation and scintillates, emitting the captured energy in the form of photons. A photosensor of the scintillator-based detector detects the emitted photons. Radiation detection apparatuses can analyze pulses for many different reasons. Continued improvements are desired.

BRIEF DESCRIPTION OF THE DRAWINGS

Embodiments are illustrated by way of example and are not limited in the accompanying figures.

Figure 1:
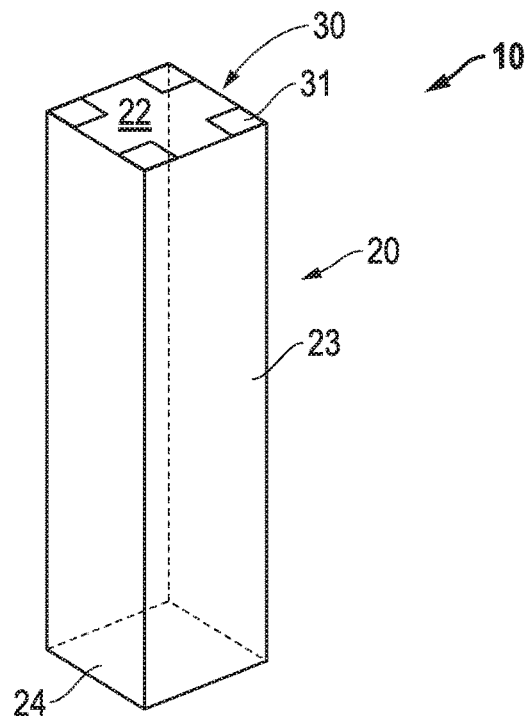
FIG. 1 includes an illustration of a plurality of photosensors disposed on a single surface of a scintillator according to certain embodiments described herein.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, unless otherwise stated, the term "energy resolution" (also referred to as PHR for pulse height resolution) refers to a parameter measured by recording a spectrum representing the activity of a source as a function of energy, this spectrum describing the full width at half maximum ("FWHM") of a peak which divided by the energy (abscissa of the peak maximum), multiplied by 100%, gives the PHR as a percentage—the lower the PHR, the better the spectral resolution.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the scintillation and radiation detection arts.

The inventors have developed an arrangement of a photosensor applied to a scintillator to improve light collection efficiency and energy resolution. A photosensor, such as a semiconductor-based photosensor, can be very small and can be read out individually in an array. Thus, such a photosensor can be arranged in various patterns on a surface of a scintillator without covering the entire area of the surface. As will be discussed in more detail below, the arrangement of a photosensor on a scintillator surface can include placing a photosensor at each corner or along the peripheral edge of a scintillator surface, instead of at the center of the scintillator surface. Additionally, the aspect ratio of the scintillator can be selected to improve energy resolution.

Figure 2:
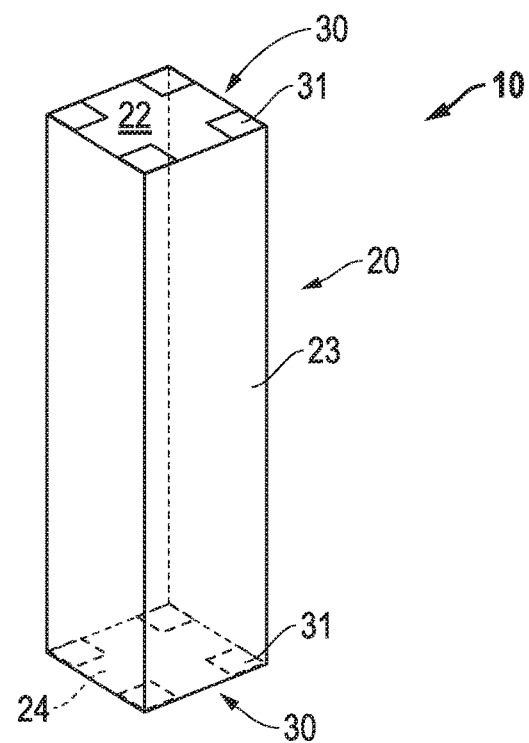
FIG. 2 includes an illustration of a plurality of photosensors disposed on opposing surfaces of a scintillator according to certain embodiments described herein.
Figure 3:
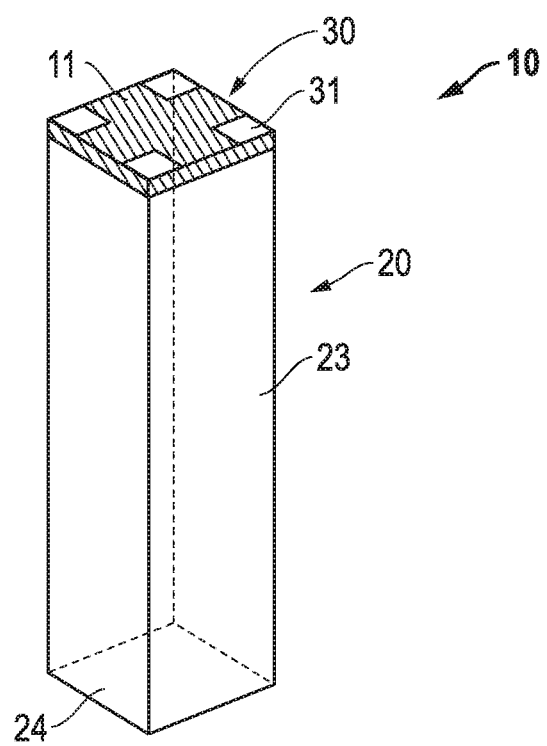
FIG. 3 includes an illustration of an optical window disposed between a scintillator and a plurality of photosensors according to certain embodiments described herein.
Figure 4:
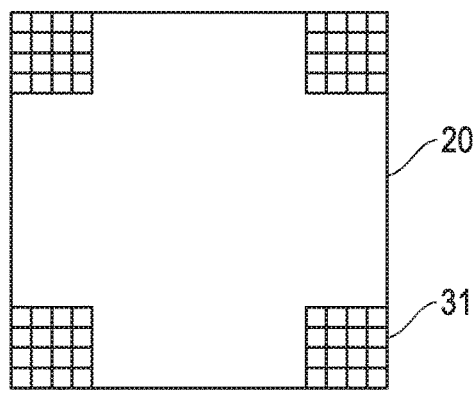
FIG. 4 includes an illustration of a plurality of photosensors arranged in a corner configuration according to certain embodiments described herein.
Figure 5:
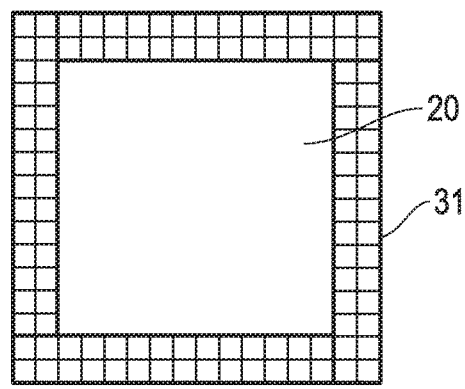
FIG. 5 includes an illustration of a plurality of photosensors arranged in an edge configuration according to certain embodiments described herein.

Referring to FIGS. 1 to 3, a radiation detector 10 can include a scintillator 20 and a photosensor system 30 disposed on a scintillator surface 22. In the embodiment illustrated in FIG. 1, the photosensor system 30 is placed only on the scintillator surface 22. In an embodiment, a photosensor can also be disposed on a side surface 23 of the scintillator 20.

In the embodiment illustrated in FIG. 1, the photosensor 30 does not cover the entire area of the scintillator surface 22. In an embodiment, the photosensor system 30 can occupy a cumulative area of at most 80%, or at most 60%, or at most 40%, or at most 30%, or at most 25% of the surface area of the scintillator surface 22. Further, the photosensor system 30 can occupy a cumulative area of at least 1%, or at least 5%, or at least 10%, or at least 15%, or at least 20% of a total area of scintillator surface 22. Moreover, the photosensor system 30 can occupy a cumulative area within a range of any of the above minimum and maximum values, such as 1 to 80%, or 10 to 40% of the total area of the scintillator surface. For example, a total coverage of 15 to 30%, or even 20 to 25% can achieve approximately the same energy resolution as 100% coverage for a NaI(Tl) scintillator. In the embodiment illustrated in FIGS. 1 and 2, the photosensor system 30 does not occupy any area within a distance of the center point of the scintillator surface 22 that is 10% of the distance from the center point of the scintillator surface 22 to the nearest peripheral edge of the scintillator surface 22. In an embodiment, the cumulative area can represent a total area occupied by the photosensor system or a total active area of the photosensor system.

In an embodiment, the photosensor system 30 can include a discrete photosensor 31 or a plurality of discrete photosensor 31 each arranged individually on the surface 22. The discrete photosensor 31 can include a solid state photosensor, such as a semiconductor-based photosensor. The semiconductor-based photosensor can include, for example, at least one of Si, SiC, GaN, InP, CdTe, or any combination thereof. In a particular embodiment, the discrete photosensor 31 can include a silicon-based photosensor.

In an embodiment, as illustrated in FIG. 3, an optical window 11 can be disposed between the scintillator 20 and the photosensor 31. The optical window 11 can be transmissive to scintillation light given off by the scintillator 20. In a particular embodiment, the optical window 11 can include a polymer film, a mineral glass, a sapphire, an aluminum oxynitride, a spinel, or any combination thereof. In a more particular embodiment, the optical window 11 can include an ultra thin mineral glass having a thickness of no greater than 300 microns.

Further, a layer of optical coupling material can be disposed on the photosensor 31, the scintillator 20, the optical window 11 if present, or any combination thereof. In an embodiment, the optical coupling material can include a grease, a resin, an adhesive, or any combination thereof, disposed between the scintillator 20 and the photosensor 31. The optical coupling material can also be transmissive to scintillation light given off by the scintillator 20.

In an embodiment, photosensor system 30 can include a discrete photosensor 31 disposed at a corner of scintillator surface 22. In the embodiment illustrated in FIG. 1, the photosensor system 30 includes a discrete photosensor disposed at each corner, in a corner configuration. In the embodiment illustrated in FIG. 5, the photosensor system 30 includes a discrete photosensor 31 disposed at each corner and along each peripheral edge of the scintillator surface 22, in an edge configuration. The edge configuration can include a single discrete photosensor 31 spanning each peripheral edge or a plurality of discrete photosensors arranged side-by-side to span each peripheral edge. Further, FIGS. 1 to 5 illustrate the discrete photosensors 31 having a rectangular or square shape. In another embodiment (not illustrated), the discrete photosensors 31 can have alternative shapes that generally fit in the area near the corner or along the peripheral edges of scintillator surface 22. For example, the discrete photosensors 31 can have a triangular shape such that a corner of the triangular shape is disposed on a corner of scintillator surface 22.

In an embodiment, the photosensor system 30 can include a discrete photosensor 31 arranged such that a peripheral edge of the discrete photosensor 31 is flush with the nearest peripheral edge of the scintillator surface 22. While it may be advantageous to have the peripheral edge of the discrete photosensor 31 as close to the nearest peripheral edge of the scintillator surface 22 as possible, achieving flush edges may not be possible in a particular application. In another embodiment, a discrete photosensor 31 can be arranged such that a peripheral edge of the discrete photosensor 31 is spaced apart from the nearest peripheral edge of the scintillator surface 22. In an embodiment, the shortest distance from the peripheral edge of the discrete photosensor 31 to the nearest peripheral edge of the scintillator surface 22 is at most 3 mm, or at most 2 mm, or at most 1 mm. If not flush, the shortest distance from the peripheral edge of the discrete photosensor 31 to the nearest peripheral edge of the scintillator surface 22 may be at least 1 micron.

Further, the shortest distance from the peripheral edge of the discrete photosensor 31 to the nearest peripheral edge of the scintillator surface 22 can be at most 10%, or at most 8%, or at most 6%, or at most 4%, or at most 2% of the shortest distance from the nearest peripheral edge of the scintillator surface 22 to the center point of the scintillator surface 22. If not flush, the shortest distance from the peripheral edge of the discrete photosensor 31 to the nearest peripheral edge of the scintillator surface 22 may be at least 0.1% of the shortest distance from the nearest peripheral edge of the scintillator surface 22 to the center point of the scintillator 20.

In an embodiment, the scintillator surface 22 can have a polygonal shape, an arcuate shape, an irregular shape, or the like. In an embodiment, the scintillator surface 22 has a polygonal shape having a plurality of corners, such as at least 3 corners, or at least 4 corners. In an embodiment, the polygonal shape has at most 10 corners, or at most 9 corners, or at most 8 corners. Further, in a particular embodiment, the polygonal shape includes a rectangular shape and, in the embodiment illustrated in FIGS. 1 and 2, the scintillator surface 22 has a square shape. In another embodiment, the scintillator surface 22 has an oval shape or a circle shape. After reading this specification, a person of ordinary skill in the art will conceive of a variety of different shapes for the scintillator surface 22.

In an embodiment, the scintillator surface 22 can have an area of at least 500 $mm^2$, or at least 700 $mm^2$, or at least 900 $mm^2$. In an embodiment, surface 22 can have an area of at most 40000 $mm^2$, or at most 30000 $mm^2$, or at most 20000 $mm^2$. For example, surface 22 can have an area in a range of any of the above minimum and maximum values, such as 500 to 40000 mm², or 700 to 30000 mm², or 900 to 20000 mm².

In an embodiment, the scintillator surface 22 can have an average width $W_S$ calculated by taking an average of the shortest distance from the center point of the scintillator surface 22 to each peripheral edge of the scintillator surface 22. For an arcuate shape, such as a circle or an oval, the average width $W_S$ is calculated by taking an average of the diameter along the major axis and the diameter along the minor axis. In an embodiment, the scintillator surface 22 has an average width $W_S$ of at least 10 mm, or at least 15 mm, or at least 20 mm. In another embodiment, surface 22 has an average width $W_S$ of at most 600 mm, or at most 500 mm, or at most 400 mm. Moreover, surface 22 can have an average width $W_S$ in a range of any of the above minimum or maximum values, such as 15 to 600 mm, or 20 to 500, or 20 to 400 mm.

In an embodiment, the photosensor system 30 can be disposed on more than one surface of the scintillator 20. In an embodiment the photosensor system 30 can be disposed on opposing scintillator surfaces, each having discrete photosensors 31 disposed thereon. In the embodiment illustrated in FIG. 2, the discrete photosensors 31 are only disposed on opposing scintillator surfaces 22 and 24. The scintillator surface 24, and a discrete photosensor 31 disposed on the scintillator surface 24, can have one or more of the features described above with respect to the scintillator surface 22, and a discrete photosensor 31 disposed on the scintillator surface 22. The size and shape of scintillator surfaces 22 and 24 can be the same or different. For example, the shape of the scintillator surfaces 22 and 24 can be the same while the sizes of surfaces 22 and 24 are different, such as a frustum of a cone or pyramid. Further, the arrangement of the discrete photosensors 31 on the scintillator surfaces 22 and 24 can be the same or different.

The scintillator 20 can have a length L measured from the scintillator surface 22 to the scintillator surface 24. In an embodiment, the length L is greater than or equal to the average width $W_S$ of the scintillator surface 22. In an embodiment, the length L can be at least 10 mm, or at least 20 mm, or at least 30 mm. In another embodiment, the length L can be at most 5000 mm, or at most 4000 mm, or at most 3000 mm. Moreover, the length L can be in a range of any of the above minimum and maximum values, such as 10 to 5000 mm, or 20 to 4000 mm, or 30 to 3000 mm. However, while the scintillator can have a length L within the values discussed above, after reading this specification, a person of ordinary skill in the art will understand how the photosensor system 30 discussed herein could be applied to the surface of a scintillator having a length L that is less than or greater than the values discussed above.

In an embodiment, the scintillator 20 can be a cube having the dimensions of at least 25 mm×25 mm×25 mm or at least 50 mm×50 mm×50 mm. In an embodiment, scintillator 20 can be a cuboid having the dimensions of at least 25 mm×25 mm×50 mm; or at least 50 mm×50 mm×100 mm; or at least 50 mm×100 mm×400 mm; or at least 100 mm×100 mm×400 mm. In an embodiment, the scintillator 20 can be a cylinder having a diameter of at least 25 mm, or at least 50 mm, or at least 75 mm, or at least 100 mm, or at least 125 mm, and a length of at least 25 mm, or at least 50 mm, or at least 75 mm, or at least 100 mm, or at least 125 mm. In a particular embodiment, the length L of the cylinder is the same as the average width $W_S$ of the scintillator surface 22 of the cylinder. In a further embodiment, the length L of the cylinder is greater than the diameter of the scintillator surface 22 of the cylinder, even at least twice the diameter of the cylinder.

In an embodiment, as discussed previously in this disclosure, a significant improvement in energy resolution can be achieved by selecting a scintillator having the appropriate aspect ratio. As used herein, the aspect ratio of the scintillator 20 is equal to the length L of the scintillator 20 divided by the average width $W_S$ of the scintillator surface 22. In an embodiment, the energy resolution decreases, which is desired, as the aspect ratio of the scintillator 20 increases from about 1. For example, in an embodiment, the aspect ratio of the scintillator 20 is at least 1, or at least 1.2, or at least 1.4, or at least 1.6, or at least 1.8. In an embodiment, if the aspect ratio is too high, the energy resolution can begin to increase, which is undesired. For example, in an embodiment, the aspect ratio of the scintillator 20 may be at most 7, or at most 6.5, or at most 6, or at most 5.5. Moreover, the aspect ratio of the scintillator 20 can be within a range of any of the above minimum and maximum values, such as 1.2 to 7, or 1.4 to 6.5, or 1.6 to 6, or 1.8 to 5.5.

A radiation detector including a scintillator having an aspect ratio within the above ranges can show a decrease in energy resolution as compared to radiation detectors including scintillators having an aspect ratio outside of these ranges. For example, for an energy resolution of at most 6.75%, scintillator 20 can have an aspect ratio of 1 to 7; for an energy resolution of at most 6.65%, scintillator 20 can have an aspect ratio of 1.4 to 6.2; and for an energy resolution of at most 6.55, scintillator 20 can have an aspect ratio of 2 to 5.5. After reading the specification, a person of ordinary skill in the art will understand that the aspect ratios and relative improvement in energy resolution may depend on the particular composition of the scintillator and discrete photosensors 31 used.

Further, scintillator 20 can include a scintillator material that is particularly suited for a particular application, so long as a photosensor 30 can be disposed on scintillator 20. In an embodiment, the scintillator material is an inorganic scintillator material. For example, the inorganic scintillator material can include a sodium iodide, a cesium iodide, a bismuth germinate, a lanthanum bromide, a cerium bromide, a lanthanum chloride, a lutetium oxyorthosilicate, a lutetium yttrium oxyorthosilicate, a cesium lithium lanthanum bromide, a cesium lithium lanthanum bromo-chloride, a cesium lithium yttrium chloride, or any combination thereof. In another embodiment, the scintillator is an organic scintillator material. For example, the organic scintillator material can include a plastic scintillator, an anthracene, a stilbene, or any combination thereof. In an embodiment, the scintillator 20 can be a monolithic scintillator.

An advantage of the radiation detector described herein includes achieving improved performance while the photosensor cumulatively occupies less than the full area of the surface of the scintillator. For example, the radiation detector 10 can have an improved single-end light collection efficiency and dual-end light collection efficiency. As used herein, the term "single-end," at least when used with respect to performance parameters of the radiation detector 10, refers to a measurement taken from a single end surface of the scintillator, and the term "dual-end," at least when used with respect to performance parameters of the radiation detector, refers to a measurement taken from a two opposing end surfaces of the scintillator.

Figure 7:
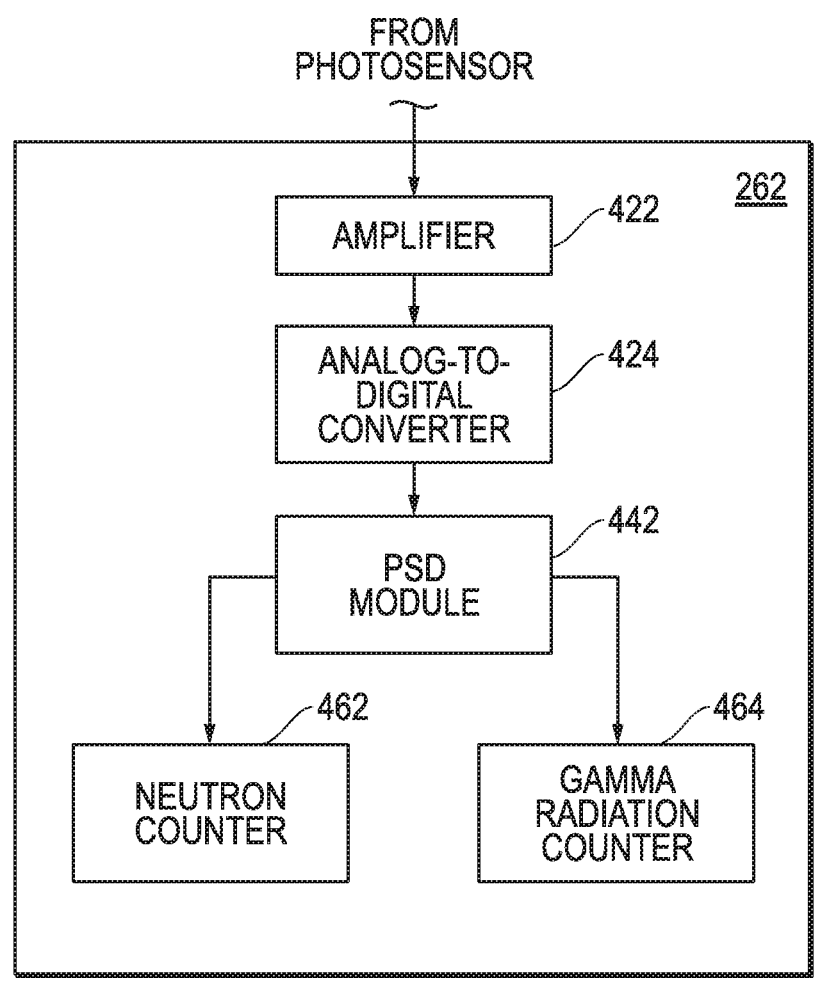
FIG. 7 includes an illustration of an analyzer device according to an embodiment described herein.

The radiation detector 10 can further include an analyzer device electrically coupled to the photosensors 30, as illustrated in FIG. 7. The analyzer device 262 can include hardware and can be at least partly implemented in software, firmware, or a combination thereof. In an embodiment, the hardware can include a plurality of circuits within an field-programmable gate array (FPGA), an application-specific integrated circuit (ASIC), another integrated circuit or on a printed circuit board, or another suitable device, or any combination thereof. The analyzer device 262 can also include a buffer to temporarily store data before the data are analyzed, written to storage, read, transmitted to another component or device, another suitable action is performed on the data, or any combination thereof.

In the embodiment illustrated in FIG. 7, the analyzer device 262 can include an amplifier 422 coupled to the photosensor system 30, such that an electronic pulse from the photosensor system 30 can be amplified before analysis. The amplifier 422 can be coupled to an analog-to-digital converter (ADC) 424 that can digitize the electronic pulse. The ADC 424 can be coupled to a pulse shape discrimination (PSD) module 442. In a particular embodiment, the PSD module 442 can include a FPGA or an ASIC. In a particular embodiment, the PSD module 442 can include circuits to analyze the shape of the electronic pulse and determine whether the electronic pulse corresponds to a neutron or gamma radiation. In a more particular embodiment, the PSD module 442 can use the electronic pulse, information derived from the electronic pulse, and temperature from the temperature sensor with a look-up table to determine whether the electronic pulse corresponds to a neutron or gamma radiation. The look-up table can be part of the FPGA or ASIC or may be in another device, such as an integrated circuit, a disk drive, or a suitable persistent memory device.

Figure 6:
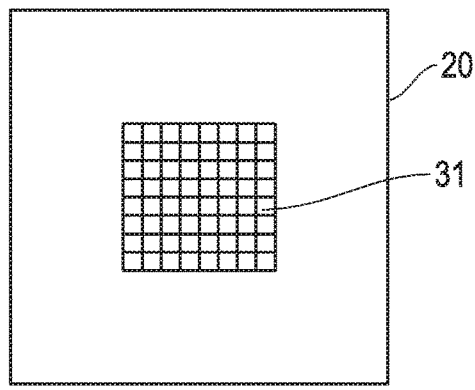
FIG. 6 includes an illustration of a plurality of photosensors arranged in a center configuration according to a comparative example described herein.

The analyzer device 262 can further comprise a neutron counter 462 and a gamma radiation counter 464. If the PSD module 442 determines that an electronic pulse corresponds to a neutron, the PSD module 442 increments the neutron counter 462. If the PSD module 442 determines that an electronic pulse corresponds to gamma radiation, the PSD module 442 increments the gamma radiation counter 464. While FIG. 6 illustrates a dual mode radiation detector, in other embodiments the radiation detector could be single mode radiation detector and the analyzer could include only one of the neutron counter 462 or the gamma radiation counter 464, or may the radiation detector may be used to identify a particular material based on the pulse energy.

Any of the scintillators as previously described can be used in a variety of applications. Exemplary applications include radiation detectors for security applications, oil well-logging detectors, gamma ray spectroscopy, isotope identification, Single Positron Emission Computer Tomography (SPECT) or Positron Emission Tomography (PET) analysis, and x-ray imaging. The radiation detectors for security applications can include a portal monitor radiation detector, a handheld radiation detector, and a personal radiation detector.

Many different aspects and embodiments are possible. Some of those aspects and embodiments are described herein. After reading this specification, skilled artisans will appreciate that those aspects and embodiments are only illustrative and do not limit the scope of the present invention. Additionally, those skilled in the art will understand that some embodiments that include analog circuits can be similarly implement using digital circuits, and vice versa. Embodiments may be in accordance with any one or more of the embodiments as listed below.

Embodiment 1. A radiation detector comprising:
a scintillator having a first surface; and
a photosensor system comprising a discrete photosensor disposed on the first surface such that a shortest distance from a peripheral edge of the discrete photosensor to a nearest peripheral edge of the first surface is at most 10% of a shortest distance from the nearest peripheral edge of the first surface to a center point of the first surface, and at least one of the following:
the photosensor system occupies a cumulative area of at most 80% of a surface area of the first surface, and the photosensor system does not occupy any area within a distance of the center point of the first surface that is 10% of the distance from the center point of the first surface to the nearest peripheral edge of the first surface.

Embodiment 2. The radiation detector of embodiment 1, wherein the shortest distance from the peripheral edge of the discrete photosensor to the nearest peripheral edge of the first surface is at most 8%, at most 6%, or at most 4%, or at most 2% of the shortest distance from the nearest peripheral edge of the first surface to the center point of the first surface.

Embodiment 3. The radiation detector of any one of the preceding embodiments, wherein the shortest distance from the peripheral edge of the discrete photosensor to the nearest peripheral edge of the first surface is at most 3 mm, or at most 2 mm, or at most 1 mm.

Embodiment 4. The radiation detector of any one of the preceding embodiments, wherein the scintillator is a polyhedral scintillator.

Embodiment 5. The radiation detector of any one of the preceding embodiments, wherein at least one of the end surfaces has a polygonal shape including a rectangle.

Embodiment 6. The radiation detector of embodiment 5, wherein the polygonal shape is a square.

Embodiment 7. The radiation detector of any one of the preceding embodiments, wherein the scintillator is a cube.

Embodiment 8. The radiation detector of embodiment 7, wherein the cube has dimensions of at least 25 mm×25 mm×25 mm or at least 50 mm×50 mm×50 mm.

Embodiment 9. The radiation detector of any one of embodiments 1 to 6, wherein the scintillator is a cuboid.

Embodiment 10. The radiation detector of embodiment 8, wherein the cuboid has width× height× length dimensions of at least 25 mm×25 mm×50 mm; or at least 50 mm×50 mm×100 mm; or at least 50 mm×100 mm×400 mm; or at least 100 mm×100 mm×400 mm.

Embodiment 11. The radiation detector of any one of the preceding embodiments, wherein the first surface has a corner and the discrete photosensor is disposed at the corner of the first surface.

Embodiment 12. The radiation detector of any one of the preceding embodiments, wherein the photosensor system includes a plurality of discrete photosensors disposed on the first surface.

Embodiment 13. The radiation detector of embodiment 12, wherein the first surface has a plurality of corners and peripheral edges connecting the corners, and the plurality of discrete photosensors are only disposed at the corners of the first surface.

Embodiment 14. The radiation detector of embodiment 12, wherein first surface has a plurality of corners and peripheral edges connecting the corners, and the plurality of discrete photosensors are disposed at each of the corners and along peripheral edges of the first surface.

Embodiment 15. The radiation detector of embodiment 14, wherein the plurality of discrete photosensors are only disposed at the corners and along the peripheral edges of the first surface.

Embodiment 16. The radiation detector of any one of the preceding embodiments, wherein the photosensor system includes only the plurality of discrete photosensors disposed on the first surface.

Embodiment 17. The radiation detector of any one of embodiments 1 to 15, wherein the scintillator has a second surface opposite the first surface, and the photosensor system includes a first plurality of discrete photosensors disposed on the first surface and a second plurality of discrete photosensors disposed on the second surface.

Embodiment 18. The radiation detector of embodiment 17, wherein the first and second plurality of discrete photosensors are disposed on the first and second surfaces, respectively, in the same arrangement.

Embodiment 19. The radiation detector of any one of preceding embodiments, wherein a total active area of the discrete photosensors disposed on the first surface is at least 1%, or at least 5% or at least 10%, or at least 15%, or at least 20% of the surface area of the first surface.

Embodiment 20. The radiation detector of any one of preceding embodiments, wherein a total active area of the discrete photosensors disposed on the second surface is at most 80%, or at most 60% or at most 40%, or at most 30%, or at most 25% of the surface area of the second surface.

Embodiment 21. The radiation detector of any one of preceding embodiments, wherein a total active area of the discrete photosensors disposed on the second surface is in a range of 1 to 80%, or 10 to 40%, or 15 to 30%, or 20 to 25% of the surface area of the second surface.

Embodiment 22. The radiation detector of any one of embodiments 19 to 21, wherein a total active area of the discrete photosensors on each of the first and second surfaces is the same.

Embodiment 23. The radiation detector of any one of the preceding embodiments, wherein the discrete photosensor comprises a semiconductor-based photomultiplier.

Embodiment 24. The radiation detector of any one of the preceding embodiments, wherein discrete photosensor comprises a silicon-based photomultiplier.

Embodiment 25. The radiation detector of any one of the preceding embodiments, wherein the scintillator comprises an inorganic scintillator material.

Embodiment 26. The radiation detector of embodiment 25, wherein the inorganic scintillator material comprises a sodium iodide, a cesium iodide, a bismuth germinate, a lanthanum bromide, a cerium bromide, a lanthanum chloride, a lutetium oxyorthosilicate, a lutetium yttrium oxyorthosilicate, a cesium lithium lanthanum bromide, a cesium lithium lanthanum bromo-chloride, a cesium lithium yttrium chloride, or any combination thereof.

Embodiment 27. The radiation detector of any one of embodiments 1 to 24, wherein the scintillator comprises an organic scintillator material.

Embodiment 28. The radiation detector of embodiment 27, wherein the organic scintillator material comprises an anthracene, a stilbene, or a plastic.

Embodiment 29. The radiation detector of any one of the preceding embodiments, wherein at least one photosensor is disposed on a side surface of the scintillator.

Embodiment 30. The radiation detector of any one of preceding embodiments, wherein the scintillator has an aspect ratio of at least 1, or at least 1.2, or at least 1.4, or at least 1.6, or at least 1.8, the aspect ratio being equal to the length L of the scintillator divided by the average width $W_S$ of the first surface.

Embodiment 31. The radiation detector of any one of the preceding embodiments, wherein the scintillator has an aspect ratio of at most 7, or at most 6.5, or at most 6, or at most 5.5, the aspect ratio being equal to the length L of the scintillator divided by the average width $W_S$ of the first surface.

Embodiment 32. The radiation detector of any one of the preceding embodiments, wherein the scintillator has an aspect ratio in a range of 1.2 to 7, or 1.4 to 6.5, or 1.6 to 6, or 1.8 to 5.5, the aspect ratio being equal to the length L of the scintillator divided by the width $W_S$ of the first surface.

Embodiment 33. The radiation detector of any one of the preceding embodiments, wherein an optical window is disposed between the scintillator and the photosensor system.

Embodiment 34. The radiation detector of embodiment 33, wherein the optical window comprises a polymer film, a mineral glass, a sapphire, an aluminum oxynitride, a spinel, or any combination thereof.

Embodiment 35. The radiation detector of embodiment 34, wherein the optical window comprises the mineral glass and has a thickness of no greater than 300 microns.

Embodiment 36. A radiation detection apparatus comprising:
  the radiation detector of any one of the preceding embodiments, and
  an analyzer device electrically coupled to the photosensor.

Embodiment 37. The radiation detection apparatus of embodiment 36, wherein the radiation detection apparatus includes one of a security detection apparatus, an welllogging detection apparatus, a gamma ray spectroscopy apparatus, an isotope identification apparatus, Single Positron Emission Computer Tomography (SPECT) analysis apparatus, a Positron Emission Tomography (PET) analysis apparatus, and an x-ray imaging apparatus.

EXAMPLES

The Examples are given by way of illustration only and do not limit the scope of the present invention as defined in the appended claims.

Example 1

A simulation was conducted to determine the change in detector performance based on the arrangement of discrete photosensors on a scintillator surface. The simulation was based on cuboidal NaI scintillators having the dimensions of 4 inches (about 10.2 cm)×4 inches (about 10.2 cm)×16 inches (about 40.6 cm) and plurality of discrete photosensors placed on one or opposing surfaces of the cuboidal NaI scintillators in a corner configuration (see FIG. 4), an edge configuration (see FIG. 5), and a center configuration (see FIG. 6).

The detector performance improvement was quantified by the width of an Impulse Response Function (IRF). For purposes of illustration, the "impulse" is a collection of pulses in a simulation that generate the same number of photons within the scintillator. In other words, a group of light pulses is generated with an energy resolution of 0%. As the scintillation light propagates around the interior of the detector, the amount of light collected by the photosensors from each pulse will vary due to variance in absorption and extinction that the geometry will impose on the random photon paths. Thus, even if the energy resolution starts out at 0%, the variation in light collection from different parts of the scintillator will worsen the energy resolution. This worsening is captured in the IRF, which has a non-zero FWHM. Detector performance is improved when the IRF FWHM is narrow. An energy resolution based on the IRF FWHM, which is referred to herein as "$R_{Transfer}$," is calculated using the following formula:

$$R_{Transfer} = \frac{IRF\ FWHM \times 100\%}{Mode\ Average},$$

where the Mode Average refers to a distribution in the number of collected photons. The detector performance is considered to improve as the $R_{Transfer}$ decreases.

Figure 8:
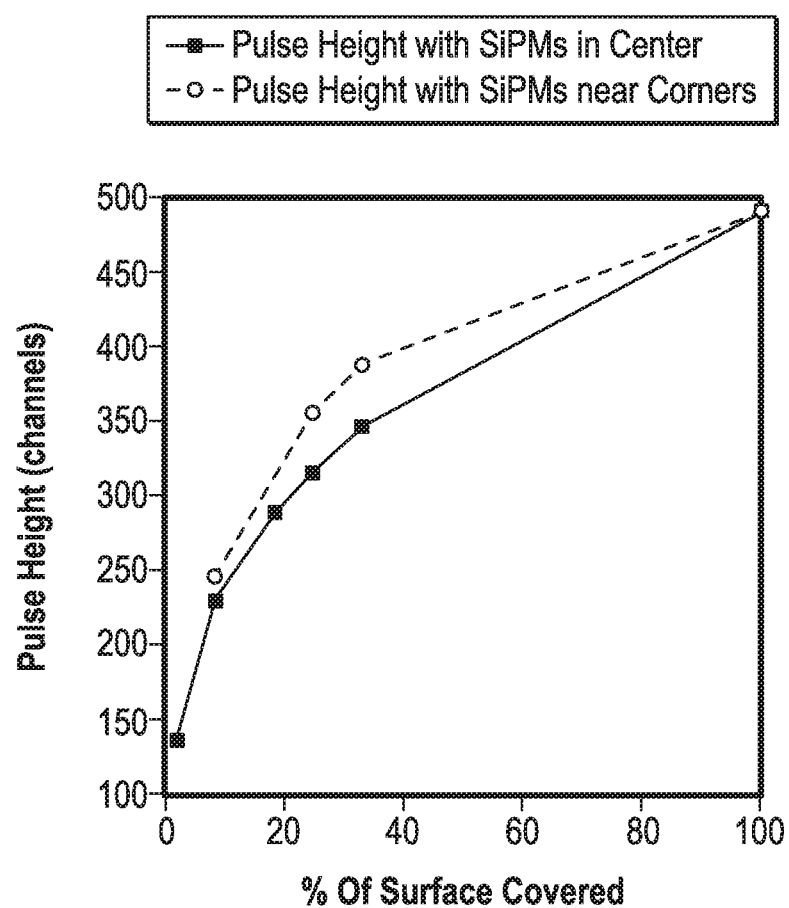
FIG. 8 includes a graph for Example 2 plotting pulse height versus a cumulative surface area occupied by a photo sensor.
Figure 9:
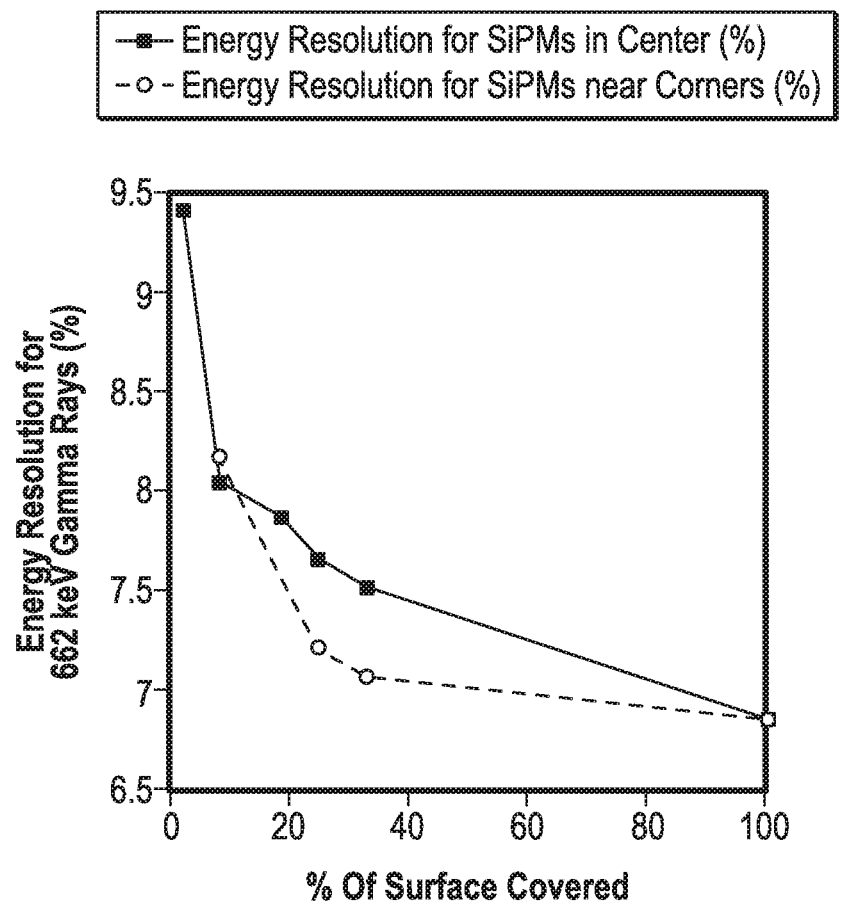
FIG. 9 includes a graph for Example 2 plotting energy resolution versus a cumulative surface area occupied by a photosensor.

The single-end configurations and $R_{Transfer}$ results are provided in Table 1 and the dual-end configurations and $R_{Transfer}$ results are listed in Table 2. For Tables 1 and 2, the term "SiPM" refers to a silicon photomultiplier having an active area of 6×6 mm$^2$, and the term "PMT" refers to a 3.5 inch photomultiplier tube.

inches (about 5 cm)×2 inches (about 5 cm)×2 inches (about 5 cm). Photosensors (SiPM, model: SensL 60035c at 27.5 V bias) were placed on a surface of each of the cube NaI(Tl) scintillators either in a corner configuration (see FIG. 4) or a center configuration (see FIG. 6). For each configuration, a series of cube NaI(Tl) scintillators was tested with a gradually increasing cumulative coverage of the surface by the photosensors. The cumulative surface area covered in percent of total surface area and pulse height for each cube NaI(Tl) scintillator are provided in the graph of FIG. 8 and the cumulative surface area covered in percent of total surface area and energy resolution for each scintillator are illustrated in the graph of FIG. 9. The graph of FIG. 8 indicates that, for a given amount of surface coverage, the amount of light collected (proportional to Pulse Height) was greater when the SiPMs were in a corner configuration vis-à-vis a center configuration. The graph of FIG. 9 indicates that the energy resolution is also better when the SiPMs were in a corner configuration vis-à-vis a center configuration.

TABLE 1

Single-End Configuration

| | Sample No. | | | | | | | |
|---|---|---|---|---|---|---|---|---|
| | 1 | 2 | 3 | 4 | 5 | 6 | 7 | 8 |
| Type of Photosensor | PMT | SiPM | SiPM | SiPM | SiPM | SiPM | SiPM | SiPM |
| No. of Photosensors | 1 | 64 | 64 | 100 | 144 | 60 | 120 | 156 |
| Configuration | n/a | Center | Corner: 16 per corner | Corner: 25 per corner | Corner: 36 per corner | Edge: 1 row | Edge: 2 rows | Edge: 3 rows |
| $R_{Transfer}$ (%) | 1.21 | 2.91 | 2.30 | 1.53 | 1.12 | 2.22 | 1.29 | 0.96 |

TABLE 2

Dual-End Configuration

| | Sample No. | | | | | | | |
|---|---|---|---|---|---|---|---|---|
| | 9 | 10 | 11 | 12 | 13 | 14 | 15 | 16 |
| Type of Photosensor | PMT | SiPM | SiPM | SiPM | SiPM | SiPM | SiPM | SiPM |
| No. of Photosensors | 1 | 64 | 64 | 100 | 144 | 60 | 120 | 156 |
| Configuration | n/a | Center | Corner: 16 per corner | Corner: 25 per corner | Corner: 36 per corner | Edge: 1 row | Edge: 2 rows | Edge: 3 rows |
| $R_{Transfer}$ (%) | 0.67 | 1.72 | 1.22 | 0.78 | 0.72 | 1.17 | 0.66 | 0.59 |

As shown by the results of the simulations, the center configuration appears to the least favorable of the three configurations. However, the $R_{Transfer}$ decreases when the photosensors are in a corner configuration and even more when the photosensors are in an edge configuration, indicating that the photons can be better detected at the corners and the edges of the surface of the scintillator, rather than at the center.

Example 2

Data were taken on cube NaI(Tl) scintillators exposed to 662 keV gamma rays from a Cs-137 gamma ray source. The cube NaI(Tl) scintillators each had the dimensions of 2

Example 3

A simulation was performed to determine detector performance improvement based on aspect ratio of the scintillator. The simulation was based on cuboidal NaI scintillators having different aspect ratios but each having a volume of about 6.5 cm$^3$. A plurality of silicon photomultipliers (SiPM) each having an active area of 6×6 mm$^2$ were placed on one of the end surfaces of the cuboidal scintillator in a corner configuration (see FIG. 4). The active area of each photosensor was 6×6 mm$^2$.

The detector performance was quantified using $R_{Transfer}$ as described in Example 1.

The different aspect ratios and the $R_{Transfer}$ results are provided in Table 3 below.

TABLE 3

| Single-End Configuration | | | | | | | | | | |
|---|---|---|---|---|---|---|---|---|---|---|
| | Sample No. | | | | | | | | | |
| | 17 | 18 | 19 | 20 | 21 | 22 | 23 | 24 | 25 | 26 |
| Type of Photosensor | SiPM | | | | | | | | | |
| No. of Photosensors | 64 | | | | | | | | | |
| Configuration | Corner: 16 per corner | | | | | | | | | |
| Aspect Ratio | 0.5 | 0.75 | 1 | 1.5 | 2 | 3 | 4 | 5 | 6 | 7 |
| $R_{Transfer}$ (%) | 2.13 | 2.07 | 1.62 | 1.11 | 0.97 | 0.73 | 0.64 | 0.86 | 1.26 | 1.69 |

Figure 10:
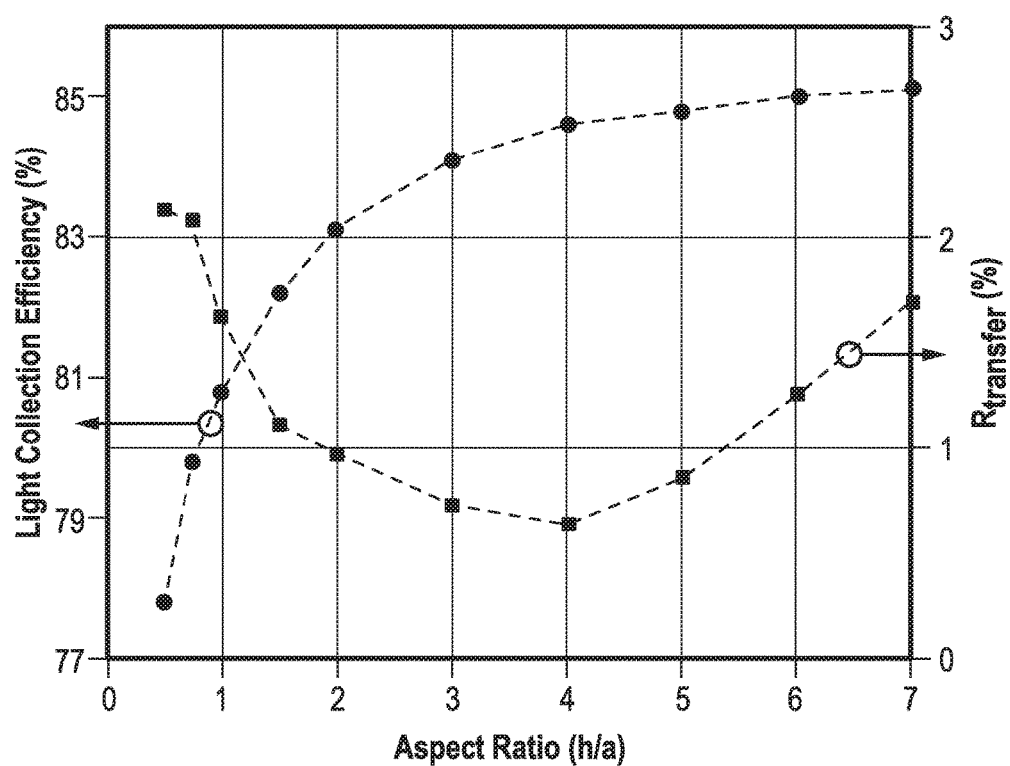
FIG. 10 includes a graph for Example 3 plotting light collection efficiency and $R_{Transfer}$ versus aspect ratio of a scintillator.
Figure 11:
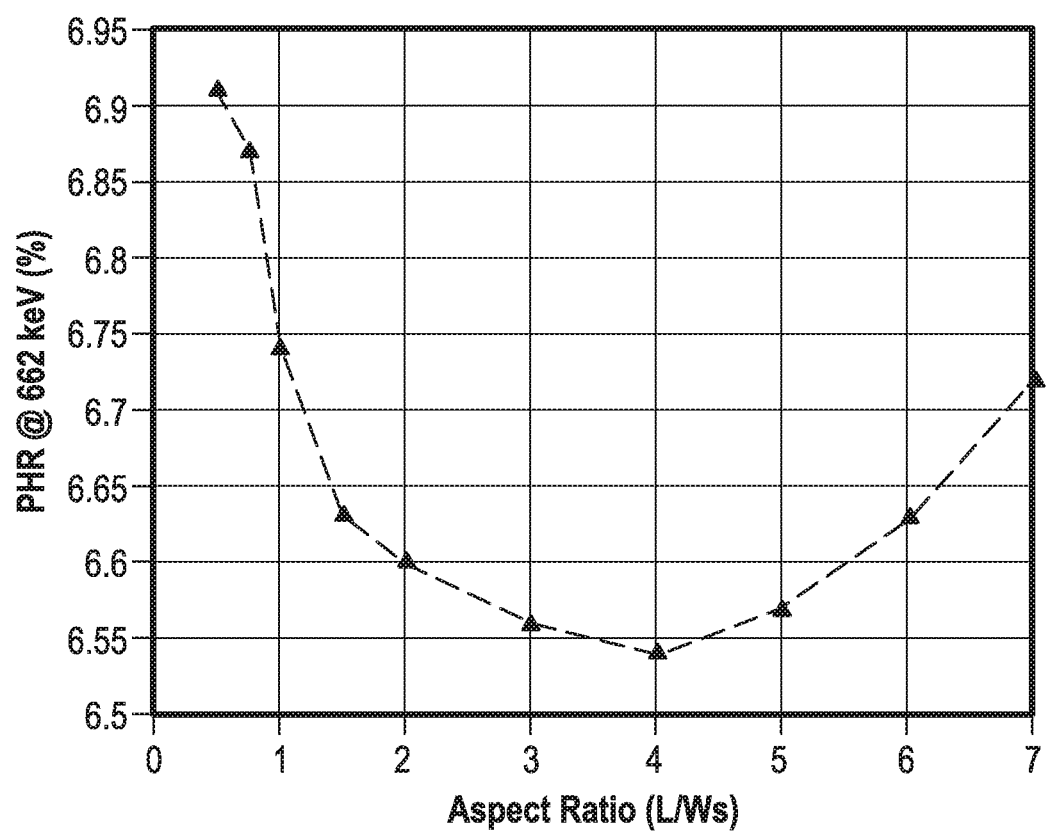
FIG. 11 includes a graph for Example 3 plotting pulse height versus aspect ratio of a scintillator.

As shown by the results of the simulation, the $R_{Transfer}$ generally decreases as the aspect ratio approaches 4. Further, the $R_{Transfer}$ is less than 1.5% when the aspect ratio is in a range of 1.5 to 6, and is less than 1% when the aspect ratio is in a range of 2 to 5. In addition, FIGS. 10 and 11 include plots of various performance parameters versus aspect ratio. In FIG. 10, the light collection efficiency (%) is on the left axis and represented by the line including circles, and $R_{Transfer}$ (%) is on the right axis and represented by the line including squares, each measured as the aspect ratio on the horizontal axis increases from left to right. Light collection efficiency refers to the fraction of photons that reach a photosensor and is proportional to pulse height. In FIG. 11, the PHR at 662 keV (%) is on the left axis and is measured as the aspect ratio on the horizontal axis increases from left to right. Light collection efficiency improves as the percentage increases, whereas geometrical non-uniformity and energy resolution improve as the percentage decreases. Thus, as illustrated in FIGS. 10 and 11, performance increases as the aspect ratio approaches 4, such as in a range of from 1 to 7, or even 1.5 to 6.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Certain features, that are for clarity, described herein in the context of separate embodiments, may also be provided in combination in a single embodiment. Conversely, various features that are, for brevity, described in the context of a single embodiment, may also be provided separately or in a subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

The invention claimed is:

1. A radiation detector comprising:
a scintillator having a first surface; and
a photosensor system comprising a discrete photosensor disposed on the first surface such that a shortest distance from a peripheral edge of the discrete photosensor to a nearest peripheral edge of the first surface is at most 10% of a shortest distance from the nearest peripheral edge of the first surface to a center point of the first surface, and at least one of the following:
the photosensor system occupies a cumulative area of at most 80% of a surface area of the first surface, and
the photosensor system does not occupy any area within a distance of the center point of the first surface that is 10% of the distance from the center point of the first surface to the nearest peripheral edge of the first surface.

2. The radiation detector of claim 1, wherein the shortest distance from the peripheral edge of the discrete photosensor to the nearest peripheral edge of the first surface is at most 2% of the shortest distance from the nearest peripheral edge of the first surface to the center point of the first surface.

3. The radiation detector of claim 1, wherein the shortest distance from the peripheral edge of the discrete photosensor to the nearest peripheral edge of the first surface is at most 3 mm.

4. The radiation detector of claim 1, wherein the scintillator is a polyhedral scintillator.

5. The radiation detector of claim 1, wherein the first surface has a corner and the discrete photosensor is disposed at the corner of the first surface.

6. The radiation detector of claim 1, wherein the photosensor system includes a plurality of discrete photosensors disposed on the first surface.

7. The radiation detector of claim 6, wherein the first surface has a plurality of corners and peripheral edges connecting the corners, and the plurality of discrete photosensors are only disposed at the corners of the first surface.

8. The radiation detector of claim 6, wherein the first surface has a plurality of corners and peripheral edges connecting the corners, and the plurality of discrete photosensors are disposed at each of the corners and along the peripheral edges of the first surface.

9. The radiation detector of claim 1, wherein:
the scintillator has a second surface opposite the first surface;
the photosensor system includes a first plurality of discrete photosensors disposed on the first surface and a second plurality of discrete photosensors disposed on the second surface; and
the first and second plurality of discrete photosensors are disposed on the first and second surfaces, respectively, in the same arrangement.

10. The radiation detector of claim 1, wherein the scintillator has a second surface opposite the first surface, and a total active area of the a plurality of discrete photosensors disposed on the second surface is at most 80% of a surface area of the second surface.

11. The radiation detector of claim 1, wherein the scintillator has a length L measured from the first surface to a second surface opposite the first surface, the scintillator has an aspect ratio of at least 1.2, the aspect ratio being equal to the length L of the scintillator divided by an average width $W_S$ of the first surface.

12. The radiation detector of claim 1, wherein the scintillator has a length L measured from the first surface to a second surface opposite the first surface, the scintillator has an aspect ratio of at most 7, the aspect ratio being equal to the length L of the scintillator divided by an average width $W_S$ of the first surface.

13. The radiation detector of claim 1, wherein the scintillator has a length L measured from the first surface to a second surface opposite the first surface, the scintillator has an aspect ratio in a range of 1.4 to 6.5, the aspect ratio being equal to the length L of the scintillator divided by a width $W_S$ of the first surface.

14. The radiation detector of claim 1, wherein an optical window is disposed between the scintillator and the photosensor system.

15. A radiation detection apparatus comprising:
the radiation detector of claim 1, and
an analyzer device electrically coupled to the photosensor,
wherein the radiation detection apparatus includes one of a security detection apparatus, a well-logging detection apparatus, a gamma ray spectroscopy apparatus, an isotope identification apparatus, Single Positron Emission Computer Tomography (SPECT) analysis apparatus, a Positron Emission Tomography (PET) analysis apparatus, and an x-ray imaging apparatus.

16. A radiation detector comprising:
a monolithic scintillator having a first surface and a second surface opposite the first surface, wherein the monolithic scintillator has a length L is measured from the first surface to the second surface; and
a photosensor system including a plurality of discrete photosensors disposed on the first surface and partially covering the first surface of the monolithic scintillator,
wherein the monolithic scintillator has an aspect ratio in a range of 1.4 to 6.5, the aspect ratio being equal to the length L of the scintillator divided by a width $W_S$ of the first surface, and the plurality of discrete photosensors are optically coupled only to the monolithic scintillator.

17. The radiation detector of claim 16, wherein the first surface has a corner and a particular discrete photosensor of the plurality of discrete photosensors is disposed at the corner of the first surface.

18. The radiation detector of claim 16, wherein the first surface has a plurality of corners and peripheral edges connecting the corners, and the plurality of discrete photosensors are only disposed at the corners of the first surface.

19. The radiation detector of claim 16, wherein first surface has a plurality of corners and peripheral edges connecting the corners, and the plurality of discrete photosensors are disposed at each of the corners and along the peripheral edges of the first surface.

* * * * *